United States Patent
Chliaguine et al.

(10) Patent No.: US 6,876,786 B2
(45) Date of Patent: Apr. 5, 2005

(54) FIBER-OPTIC SENSING SYSTEM FOR DISTRIBUTED DETECTION AND LOCALIZATION OF ALARM CONDITIONS

(75) Inventors: Mikhail Chliaguine, Baja California (MX); Vassili Spirine, Baja California (MX); Serguei Miridonov, Baja California (MX); Francisco Javier Mendieta Jimenez, Baja California (MX); Enrique Mitrani Abenchuchan, Ortiz Tirado (MX)

(73) Assignee: Cicese-Centro de Investigation, Baja California (MX)

( * ) Notice: Subject to any disclaimer, the term of this patent is extended or adjusted under 35 U.S.C. 154(b) by 136 days.

(21) Appl. No.: 10/262,064

(22) Filed: Oct. 2, 2002

(65) Prior Publication Data

US 2004/0067003 A1 Apr. 8, 2004

(51) Int. Cl.[7] .................................................. G02B 6/00
(52) U.S. Cl. .............................. 385/13; 385/12; 385/37; 250/227.11; 250/227.14; 250/227.18; 250/227.19; 356/32; 356/73.1; 356/345
(58) Field of Search ........................ 250/227.11, 227.14, 250/227.18, 227.19; 385/12, 13, 37; 356/32, 73.1, 345, 477, 482

(56) References Cited

U.S. PATENT DOCUMENTS

| | | | | |
|---|---|---|---|---|
| 4,477,725 A | | 10/1984 | Asawa | 250/227.16 |
| 4,727,254 A | | 2/1988 | Wlodarchyk | 250/227.18 |
| 4,761,073 A | | 8/1988 | Meltz | 356/32 |
| 4,806,012 A | * | 2/1989 | Meltz et al. | 356/32 |
| 4,891,511 A | | 1/1990 | Reed | 250/227.16 |
| 4,976,507 A | | 12/1990 | Udd | 385/16 |
| 5,046,848 A | | 9/1991 | Udd | 356/345 |
| 5,272,334 A | | 12/1993 | Sai | 250/227.21 |
| 5,355,208 A | | 10/1994 | Crawford | 356/35.5 |
| 5,627,637 A | | 5/1997 | Kapteyn | 356/32 |
| 5,633,748 A | * | 5/1997 | Perez et al. | 359/325 |
| 5,636,021 A | | 6/1997 | Udd | 356/345 |
| 5,757,487 A | * | 5/1998 | Kersey | 356/450 |
| 5,760,391 A | * | 6/1998 | Narendran | 250/227.14 |
| 5,767,956 A | | 6/1998 | Yoshida | 356/73.1 |
| 5,808,779 A | * | 9/1998 | Weis | 359/290 |
| 5,949,533 A | | 9/1999 | Lee | 356/73.1 |
| 6,075,907 A | * | 6/2000 | Krol | 385/12 |
| 6,335,524 B1 | * | 1/2002 | Udd et al. | 250/227.18 |
| 6,489,606 B1 | * | 12/2002 | Kersey et al. | 250/227.14 |
| 6,542,228 B1 | * | 4/2003 | Hartog | 356/73.1 |
| 6,563,969 B2 | * | 5/2003 | Ames | 385/12 |
| 6,597,822 B1 | * | 7/2003 | Moslehi et al. | 385/13 |
| 6,816,638 B1 | * | 11/2004 | Bennion et al. | 385/13 |
| 2002/0154860 A1 | * | 10/2002 | Fernald et al. | 385/37 |
| 2003/0035626 A1 | * | 2/2003 | Smith | 385/37 |

\* cited by examiner

*Primary Examiner*—Akm Enayet Ullah
*Assistant Examiner*—Daniel Petkovsek
(74) *Attorney, Agent, or Firm*—Jonathan Grant; Grant Patent Services

(57) ABSTRACT

An optical fiber sensor system comprising of an optical fiber including plurality of sensitive elements, each sensitive element has characteristic spectral band which in normal undisturbed condition lies in a first wavelength range and, under an influence of some specified condition to be detected, shifts to a second wavelength range; first and second wavelength ranges do not overlap. Means for probing an optical transmission or reflection of the fiber operate within second wavelength range to monitor the changes of the transparency or reflectivity of the fiber caused by the shift of characteristic spectral band into the second wavelength range.

The invention provides means for distributed monitoring of equipment or construction structures and detection of specified conditions and can provide alarm signal when the specified conditions become effective.

33 Claims, 9 Drawing Sheets

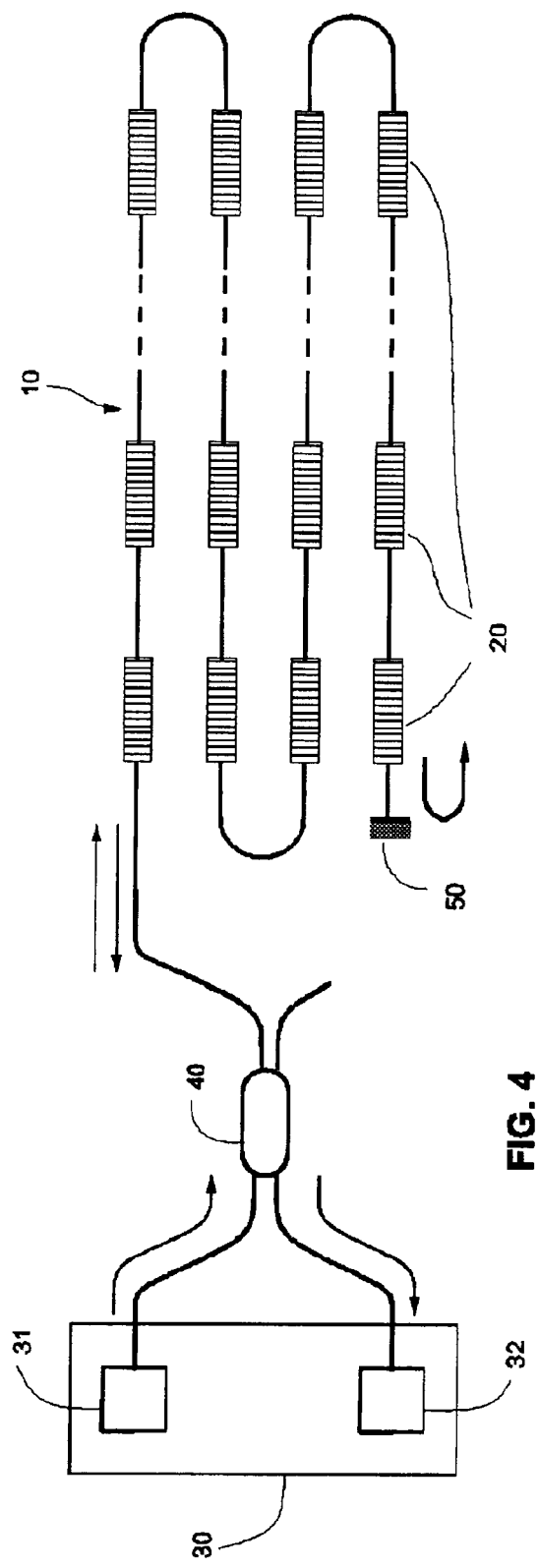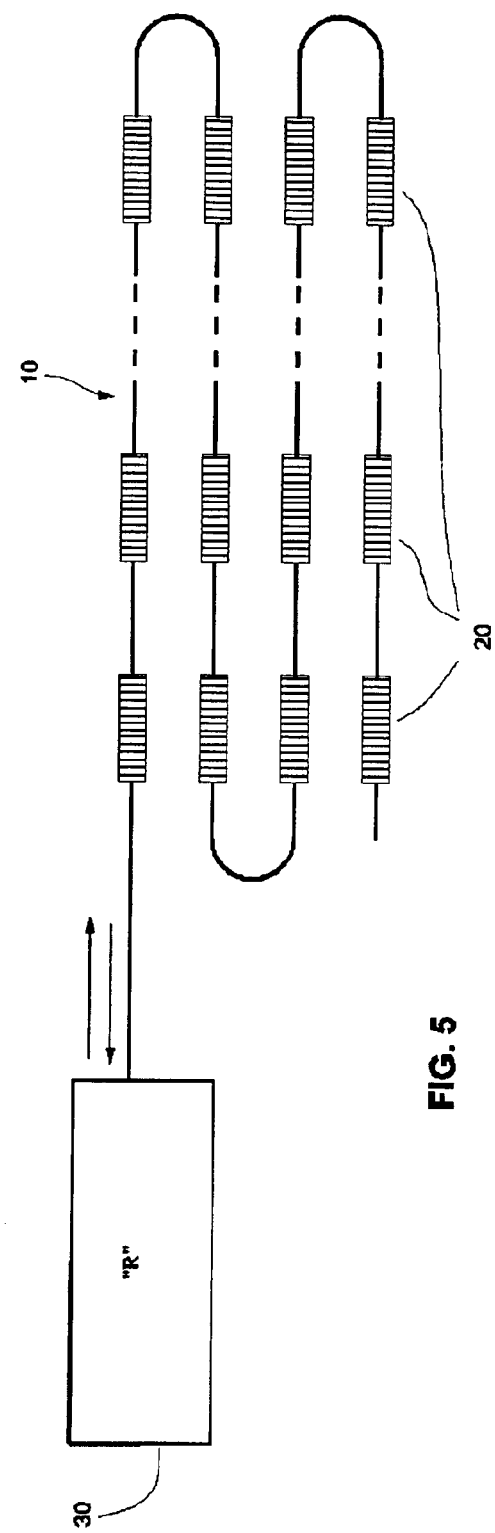

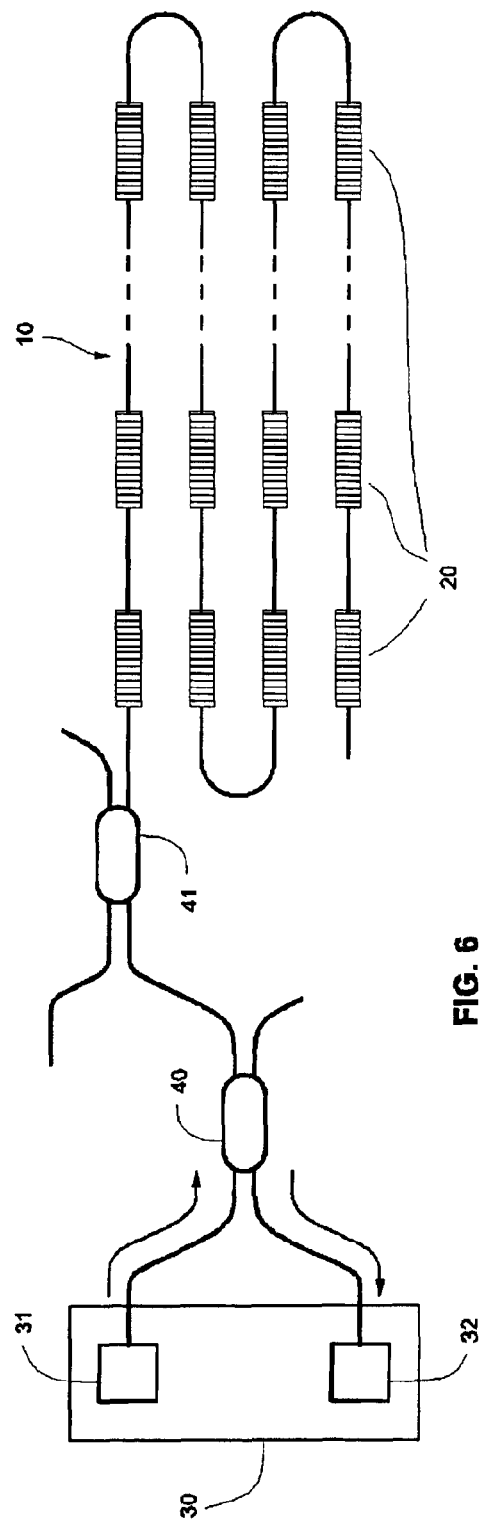
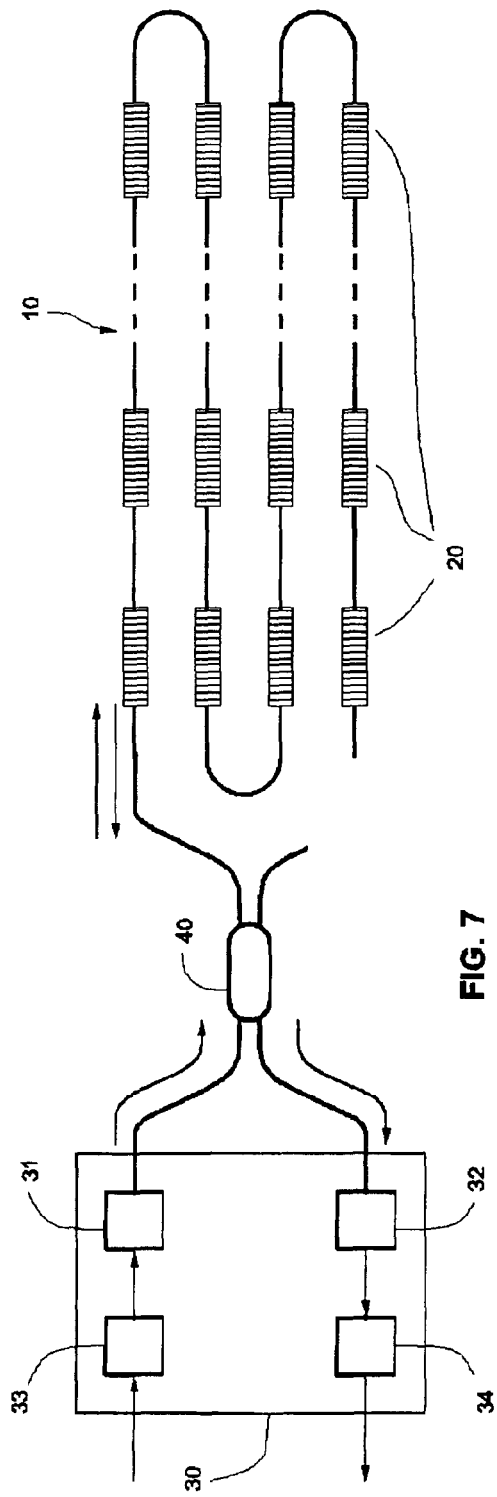
FIG. 6
FIG. 7

FIBER-OPTIC SENSING SYSTEM FOR DISTRIBUTED DETECTION AND LOCALIZATION OF ALARM CONDITIONS

BACKGROUND

1. Field of the Invention

This invention relates to fiber optic systems for early detection and location of mechanical, thermal, and other disturbances. In particular, it relates to such systems, which are used for structural monitoring of large structures and for detecting and locating fluid presence.

2. Description of Prior Art

Fiber optic sensors become attractive innovation with applications in many areas of industry and engineering. Optical fiber, due to its properties, can play roles of both sensitive element and signal delivery channel. Especially distributed fiber optics sensors are suitable for monitoring of large pieces of equipment such as planes, ships, factory equipment, pipelines, and construction structures like buildings, bridges, etc.

In recent years, many fiber optic sensing systems were developed using in-fiber Bragg gratings. Bragg gratings have narrow reflection spectral bands whose position within the optical spectrum depends on certain conditions, like temperature and axial strain. With additional components sensitive to other physical and chemical factors and mechanically connected to optical fibers with embedded Bragg gratings, such sensors become useful for measurement and detection of these factors as well.

Sensor demodulation, the recovery of information on monitored condition or factor from the optical reflection spectra of the fiber, in case of Bragg grating sensors, is performed by wavelength scanning using tunable lasers or spectrum analyzers. Also, demodulation schemes using single and double wavelength methods have been suggested where the light source emits light at one or two wavelengths within the reflection spectrum of the grating and the reflected light intensity changes with a shift of Bragg grating spectrum.

Multiplexing of fiber optic sensors enable the use of single optical fiber, light source and detecting instrumentation for distributed sensing at many points or segments along the fiber simultaneously Bragg grating based sensors can be multiplexed using wavelength division, if each Bragg grating occupies its own spectral range. Also, if spectra of Bragg gratings occupy the same wavelength range and each grating is being weakly reflective, the multiplexing can be performed using whether time domain or frequency domain reflectometry techniques.

However, it is well recognized that complete sensing systems based on in-fiber weakly reflective Bragg gratings which includes optical fiber sensing network, signal demodulation and demultiplexing subsystems are still quite expensive. The combination of light sources and high-sensitive detectors capable of multi-band high-resolution spectral analysis or/and complex time or frequency domain reflectometry does not yet provide cost effective solution for widely acceptable applications of distributed fiber optic sensors. Thus, the development of cost effective solution for fiber optic distributed sensors may be regarded as an important objective.

Failure in physical structures begins, as a rule, in a small fashion and increases with time. Early detection of failure can prevent costly or even catastrophic results of a completed failure. A cost-effective system, which could detect the onset of failure, would be of great benefits. Examples of structures that could benefit from strain level inspection, flaw and the onset of failure detection include bridges and buildings, electrical power transmission lines, long pipelines, etc. Other areas that could benefit from such inspection include structures where visual human inspection is difficult or impossible, such as underground storage tanks and underwater pipes, etc.

Fiber optic sensing techniques are very promising for such applications where a distributed sensing or multiplexing of a multiplicity of discrete sensors is required. There are a number of approaches that use disturbances in an optical beam traveling through an optical fiber as a method of detecting mechanical, thermal, and other disturbances in a structure that is to be inspected. Typically, an optical fiber is appropriately placed, affixed or embedded into a structure in such a way that disturbances in the structure could effect the optical fiber and be transferred into the fiber disturbance. The behavior of the optical beam is then monitored within the optical fiber. Books with comprehensive reviews on fiber optic sensing techniques have been published recently (see, for example, J. Dakin, B. Culshaw, editors. Optical fiber sensors, application analysis and future trends. Vol 3, 4. Artech House, London 1997; K. T. V. Gratan and B. T. Meggit, Editors. Optical Fiber Sensor Technology, Vol. 2, Chapman & Hall, London, 1998), which discussed many approaches suggested or under development for these purposes.

Fiber optic sensing systems based on different principles, such as an interferometric, the microbending induces losses, nonlinear effects in optical fibers, in-fiber Bragg gratings, etc., have been proposed and developed.

Most of the sensors utilizing the interferometric principle measure changes in the total length of the fiber. In particular, fiber optic Sagnac interferometer and the Mach-Zehnder interferometers have been proposed for varying disturbance detection (U.S. Pat. Nos. 5,636,021 and 5,046,848 to Udd, U.S. Pat. No. 5,355,208 to Crawford, et al.). However, this approach does not allow a simple locating the multiple disturbances. In particular, there are no convenient and economical means for determining the location of static or slowly varying disturbance along the extensive sensing loop.

Another technique utilizes the intensity modulation of an optical beam in the fiber that occurs from changing "microbends" in the fiber (U.S. Pat. No. 4,891,511 to Reed S., U.S. Pat. No. 4,477,725 to Asawa et al., U.S. Pat. No. 4,727,254 to Wlodarchyk, et al.). Although the microbend sensor could provide a simple solution for many applications and has capability for locating a disturbance by using OTDR technique, this method suffers from a high level of losses of the signal pulse energy in the sensing optical cable and very small energy of scattered back signal. That limits significantly a sensing length of the detector system and reduces speed of measurements because the large number of averages needed to achieve acceptable resolution.

Different distributed fiber optical sensors using nonlinear effects in fibers, such as the Kerr effect in polarization maintaining fibers have been proposed (U.S. Pat. No. 5,627,637 to Kapteyn), the Raman and Brillouln light scattering effects in multi-mode and single-mode fibers (U.S. Pat. Nos. 5,949,533, 5,767,956, 5,272,334). Such sensors provide means for distributed temperature or/and strain measuring, however their functioning is based on propagating in fiber the powerful pumping light pulses and complicated signal detection and processing. The main drawback of these sensors is their very high complexity and cost.

The FBG sensors are particularly attractive for quasi-distributed sensing because many Bragg gratings can be written into the length of fiber and be multiplexed. It is known that Bragg gratings written in optical fibers may be used to detect perturbations, such as strain or temperature, at the location of the gratings, as is described in U.S. Pat. No. 4,806,012 and 4,761,073, both to Meltz et al. However, such Bragg grating sensors require a high-resolution spectrometer to determine the sensor response, to determine the wavelength shift for each of the gratings, and to multiplex from one grating to the next. Such a spectrometer-based system is costly, delicate, and does not permit to multiplex many grating sensors. One of the main obstacles in implementing a practical system has been the development of multiplexing instrumentation capable of resolving a large number of concurrent signals at the relatively low power levels that are desirable. Moreover, the system should be tolerant of relatively long fiber lengths and permit patterns of distribution of sensors that accommodate if necessary some variations. A distributed Bragg grating-based sensor has been proposed by A. Kersey (U.S. Pat. No. 5,757,487) which combines wavelength- and time-domain multiplexing in order to increase a number of sensing points. However, this sensor is still complicated and requires the use of a multi-wavelength pulsed light source and a special multi-wavelength multiplexer.

Thus, the development of cost effective solution for fiber-optic distributed detection and location of disturbances may be regarded as an important objective.

SUMMARY

An object of the invention is to provide a simple and inexpensive optical fiber sensor system for distributed detection and localizing of alarm conditions such as overheating, excess strain of constructions or liquid substance leak from long pipes or reservoirs.

Another object of the invention is to increase number of sensors in the system.

In order to attain the above objects, the present invention provides an optical fiber sensor system comprising of an optical fiber including plurality of sensitive elements, each sensitive element has characteristic spectral band which lies in a first wavelength range in normal undisturbed conditions and, under an influence of some specified condition to be detected, shifts into a second wavelength range; first and second wavelength ranges do not overlap, means for probing an optical transmission or reflection of the fiber which operates within second wavelength range to monitor the changes of the transparency or reflectivity of the fiber caused by the shift of characteristic spectral band into the second wavelength range.

According to a first feature of the invention, the optical fiber with sensitive elements provides necessary sensitivity to the conditions of the equipment being monitored. When that predefined condition becomes effective at certain point or segment of the fiber, the sensitive element at the correspondent segment of the fiber reacts by shifting its characteristic spectral band, which can be whether reflection or loss band, or both, from its normal undisturbed position within the first wavelength range of the optical spectrum to the second wavelength range.

According to a second feature of the invention, the second wavelength range is not overlapped with the first wavelength range which is occupied by characteristic spectral bands of undisturbed sensors. Due to this, when the monitored equipment is not subjected to specified conditions, the second wavelength range is free from any reflection or losses from sensitive elements. Only natural fiber losses or reflection, due to a Rayleigh scattering, for example, are present in this case. These natural losses and reflections are typically small, constant and spectrally uniform. In turn, when the specified condition comes in effect at any point or segment of the fiber, it can be immediately detected by provided means for probing optical transmission or reflection of the entire fiber because the reflection or losses in the second wavelength range will be introduced by correspondent sensitive element due to the shift of its characteristic spectral band to said second wavelength range.

According to a third feature of the invention, if fiber Bragg gratings are utilized as sensitive elements, these gratings are not limited in their reflectivity; even high reflective grating can be used if their reflection spectra do not occupy the second wavelength range in undisturbed condition. This will significantly improve the detection capability and reduce detection time of the proposed invention because this feature provides higher signal-to-noise ratio in the output signal.

According to a fourth feature of the invention, all sensitive elements can have equal characteristics. This can significantly simplify the sensor manufacturing and reduce its cost. For example, if Bragg gratings are used as sensitive elements, they can be imprinted into the fiber during the fiber drawing.

According to a fifth feature of the invention, since second wavelength range can be a wide spectral range, means for probing optical transmission or reflection of the entire fiber can be provided by a simple light source such as semiconductor laser or superluminescent light emitting diode. This can provide cost effective solution for many applications where distributed monitoring of some specified conditions is necessary.

According to a sixth feature of the invention, localization means can be provided whether by time or frequency domain reflectometry. These means can be included on permanent basis or connected temporally through special connector for localization of the fiber segment where specified condition has occurred.

Objects and advantages of the present invention will become more apparent from consideration of the following detailed description of embodiments of the invention.

BRIEF DESCRIPTION OF THE DRAWINGS

FIG. 4 is a diagram of a forth embodiment of the invention.

FIG. 5 is a diagram of a fifth embodiment of the invention.

FIG. 6 is a diagram of a sixth embodiment of the invention.

FIG. 7 is a diagram of a seventh embodiment of the invention.

DETAILED DESCRIPTION OF THE INVENTION

In the present invention, fiber optic systems based on an array of equal spectrally selective sensing elements, whose characteristic bands can shift under external influence, are described. The spectrally selective sensing elements may be coupled optically with the optical fiber or may be written onto the fiber as fiber Bragg gratings or fiber long period gratings. In normal undisturbed conditions characteristic bands of sensing elements occupy limited wavelength range further called as first wavelength range. The present invention utilizes a light source and optical power detector to monitor transmittance or reflection of the fiber within a wavelength range which further called as second wavelength band and which does not overlap with the first wavelength range. Detected change of fiber transmittance or reflection in the second wavelength range may be used to set off an alarm signal and to perform a localization of the alarm area.

Figure 1A:
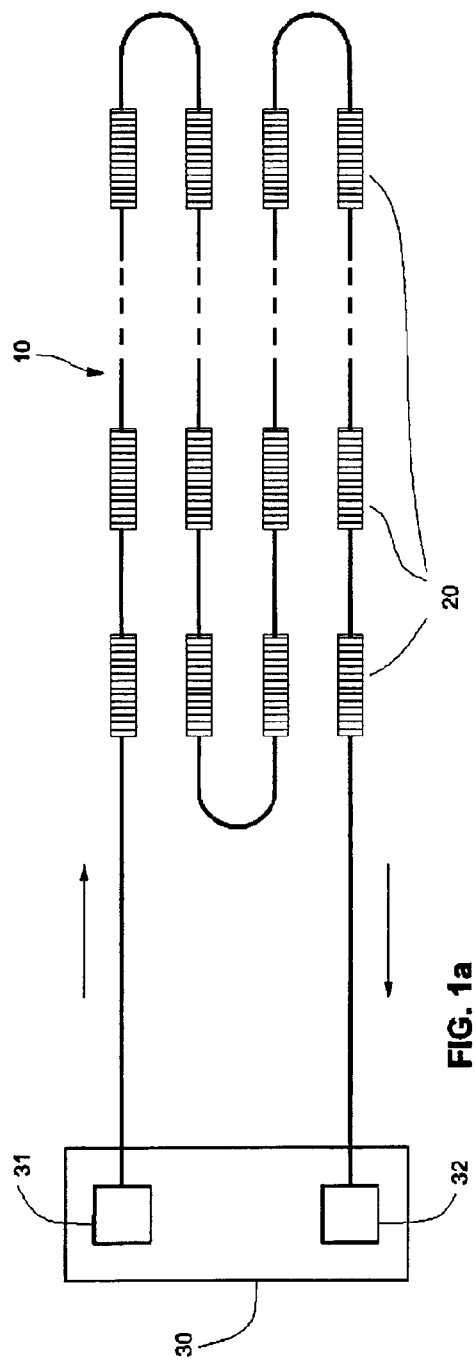
FIG. 1a is a diagram of a first embodiment of the invention with probing of the fiber transparency.

FIG. 1a shows one embodiment of the system disclosed with probing of the fiber transparency. The fiber 10 is optically coupled with a series of sensitive elements 20 and means 30 for probing optical transmission of the fiber. Sensitive elements have a characteristic spectral band, which can be whether reflection or loss band, or both, which occupies first wavelength range in normal conditions. Under the influence of specified condition, such as, for example, an excess strain or overheating, the characteristic spectral band of one or several affected sensitive elements shifts, partially or completely, into second wavelength range of spectrum and blocks partially or completely light propagating in direction of photodetector, as it is shown schematically in FIG. 1b.

Figure 1B:
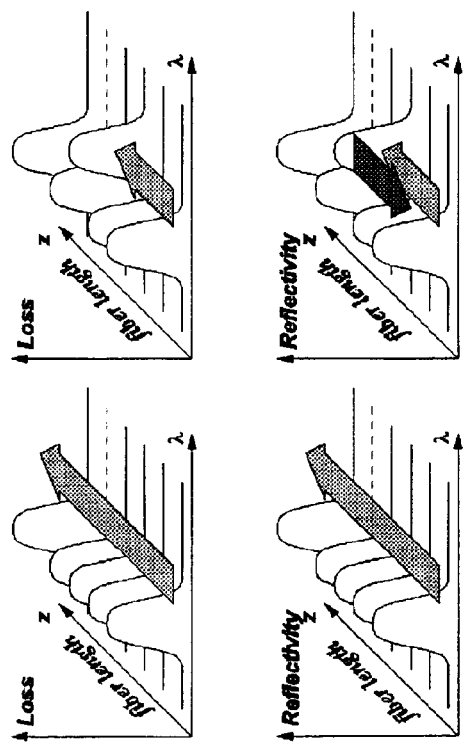
FIG. 1b illustrates schematically how a shift of the characteristic spectral band of a sensitive element affects light propagation in the fiber.

In normal undisturbed state, the light from the light source 31, such as a diode laser, operating within second wavelength range is transmitted through the fiber and reaches the photodetector 32. Under the influence of a specified condition, transmittance of the fiber changes due to the shift of the characteristic spectral band of the correspondent sensitive element, as shown in FIG. 1b. If the reflection or light loss of that element is close to 100%, the light from the source 31 is practically blocked by this element and can not reach the photodetector 32. The event of signal loss from the photodetector 32 can be used to set off the alarm system. If the reflection or light loss of that element is less than 100%, the signal from the detector changes less than in previous case but this change also can be detected.

In the embodiment shown in FIG. 1a, the sensitive elements can be long period gratings (LPG) which will attenuate, partially or completely, light propagating in the fiber due to the shift of loss spectrum of one or several affected gratings into second wavelength range, as it is illustrated in FIG. 1b. The sensitive elements can be also Bragg gratings which will block light partially or completely within second wavelength range due to the shift of their reflection spectra into second wavelength range under the influence of axial strain applied to the fiber, or under the influence of heat. Using appropriate transducers to transform a change of other conditions into an axial strain or heat, such conditions like chemical pollution can be monitored as well.

Figure 2A:
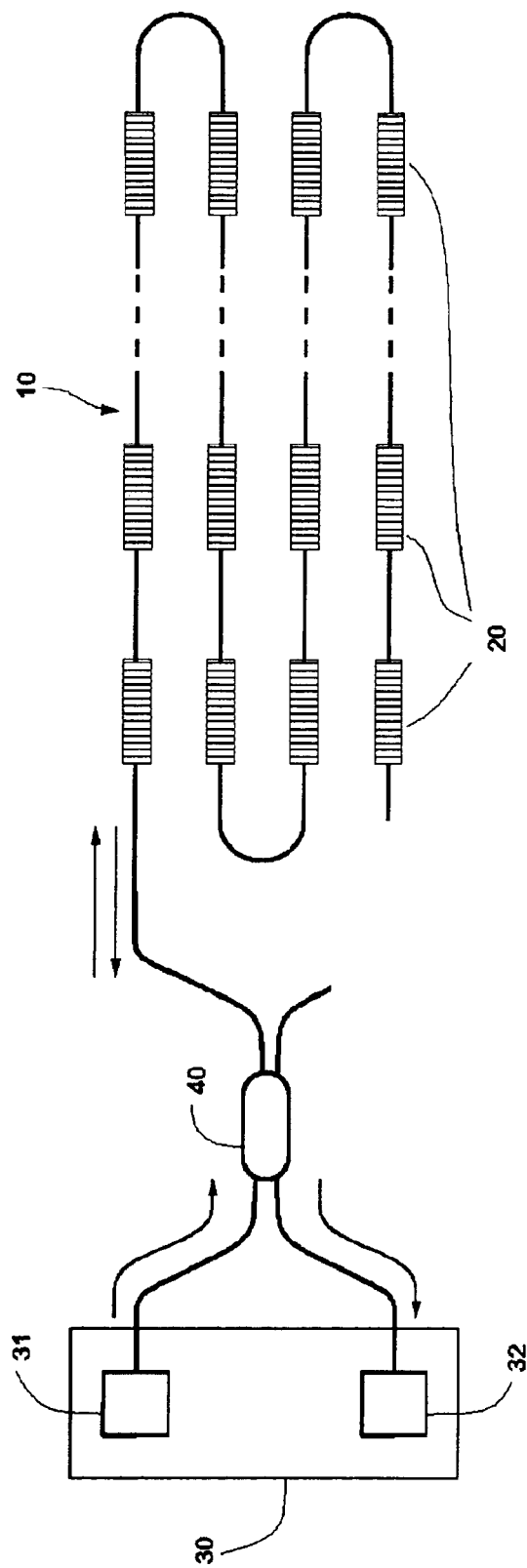
FIG. 2a is a diagram of a second embodiment of the invention with probing of the fiber reflectivity.

FIG. 2a shows another embodiment with probing of the fiber reflectivity. A bidirectional coupler 40 is included in this embodiment to transmit the light in forward direction from the light source 31 to the fiber and in backward direction from the fiber 10 to the photodetector 32. A fiber optic circulator can be used for the same purpose. Similarly, to embodiment shown in FIG. 1a, the fiber 10 is optically coupled with a series of sensitive elements 20. Sensitive elements can be Bragg gratings imprinted into the fiber core. Sensitive elements have a characteristic spectral band, which is a reflection band in this case. This band normally occupies the first wavelength range. Under the influence of specified condition, the reflection band of sensitive elements shifts, partially or completely, into the second wavelength range.

Figure 2B:
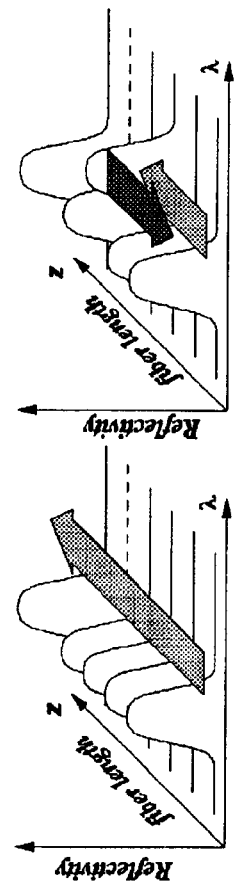
FIG. 2b illustrates schematically how a shift of the reflection band of a sensitive element affects light propagation in the fiber.

In normal undisturbed state, the light from the light source 31, such as a laser diode, with its operation wavelength within the second wavelength range, after the passage through the coupler 40, is transmitted through the fiber and does not return back to the photodetector 32. Under the influence of specified condition, one or several sensitive elements shift their characteristic reflection band into the second wavelength range, as it is shown schematically in FIG. 2b. The affected sensitive element reflects light back and light returns to the photodetector through the coupler 40. The change of signal from the photodetector 32 can be used to set off the alarm system.

In the embodiment shown in FIG. 2a, the sensitive elements can be Bragg gratings which will reflect light partially or completely within second wavelength range due to the shift of their reflection spectra into that second wavelength range under the influence of axial strain applied to the fiber, or under the influence of heat. So, the embodiment shown in FIG. 2a can also be used, for example, as excess strain or fire alarm system, or for monitoring of other conditions when using appropriate transducers.

If alarm condition has been detected on the base of change of photodetector current, the position of the alarm-producing sensitive element can be determined utilizing well-known techniques such as Optical Time Domain Reflectometry or Optical Frequency Domain Reflectometry. For this purpose, light source can be modulated and the distance to the affected sensing element can be determined on the basis of delay time of returned signal.

Figure 3A:
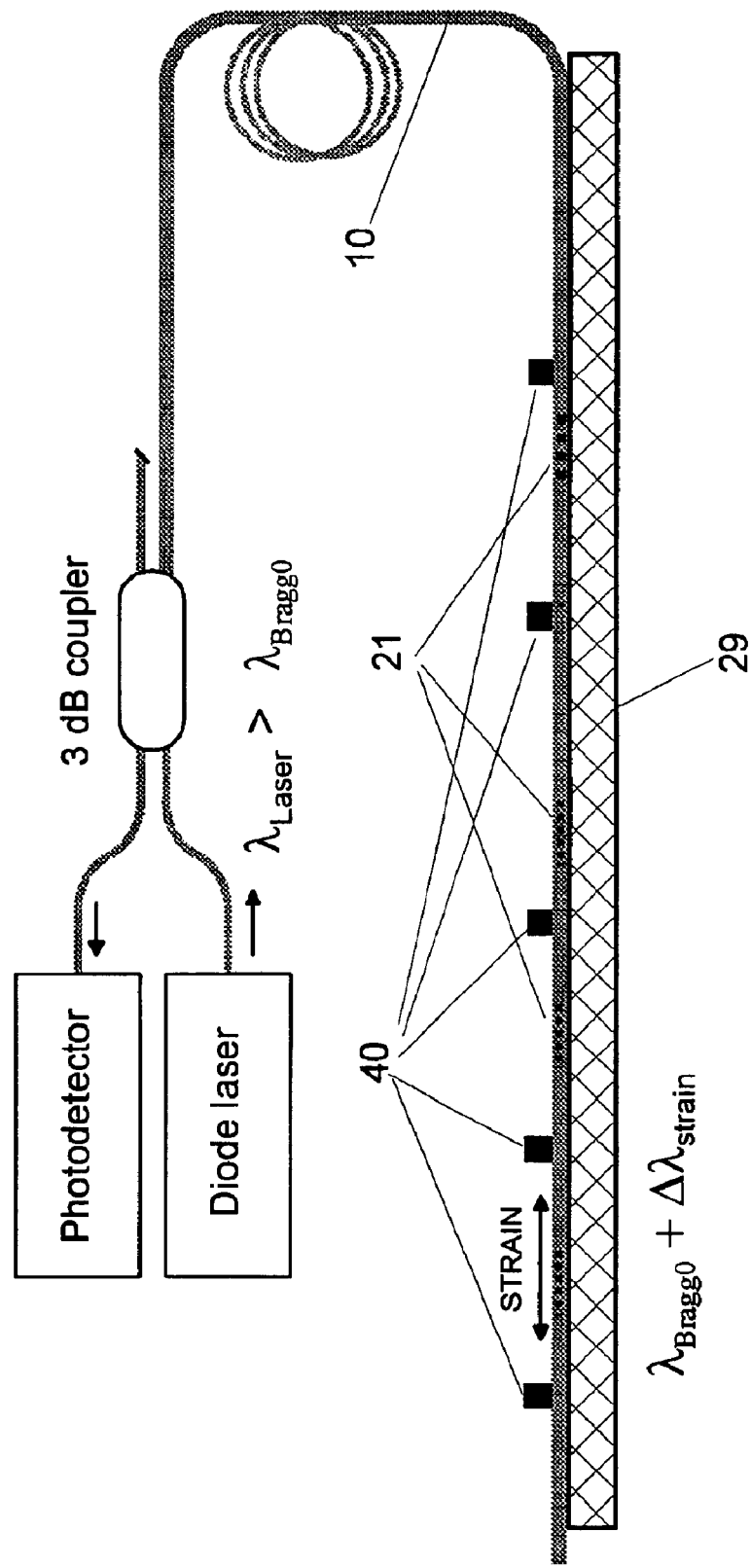
FIG. 3a is a diagram of a third embodiment of the invention.
Figure 3C:
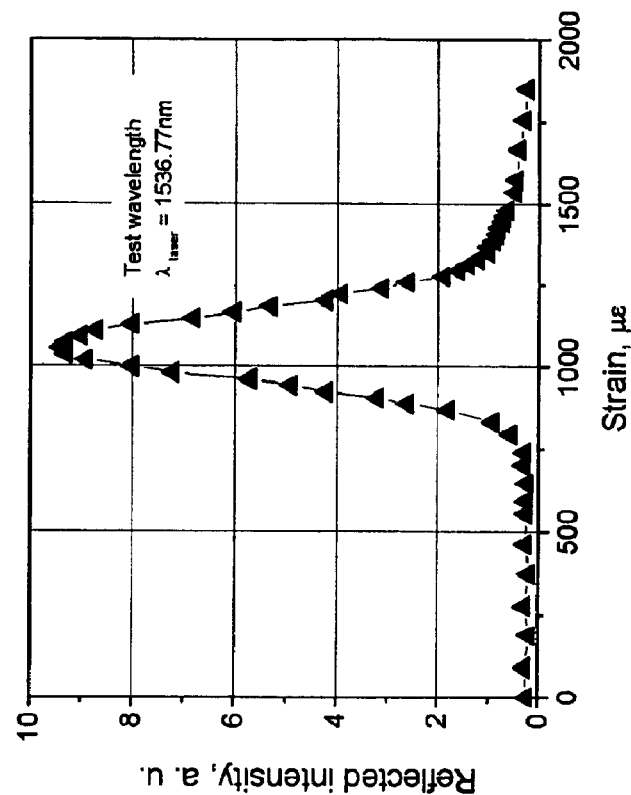
FIG. 3c shows a measured reflected light power versus strain applied to the elastic rod section to which a fiber section containing one Bragg grating was fixed.
Figure 3B:
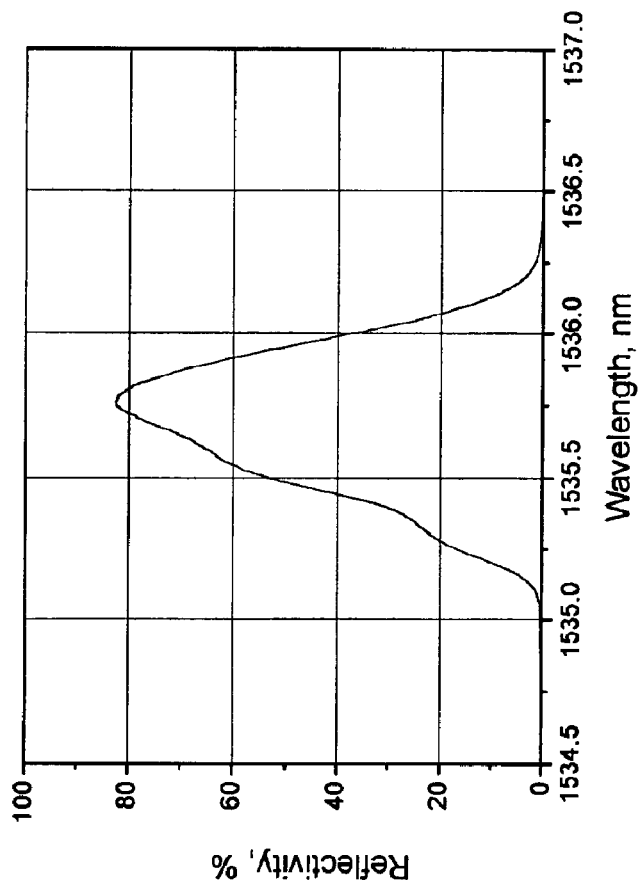
FIG. 3b illustrates a typical reflection spectrum of the fiber containing Bragg gratings in normal undisturbed conditions.

Referring now to FIG. 3a, the sensor topology of FIG. 2a can be extended to allow a distributed detection of excess strain, for instance. FIG. 3a shows schematically a third embodiment of the invention, which we used to verify at an experiment a functionality of the invention. The sensing elements were arranged in a form of a serial array of weak equal fiber Bragg gratings with the same nominal Bragg wavelengths. Seventeen Bragg gratings were imprinted in the core of a single mode fiber and were distributed along the fiber length with separating distances about 0.5 meter. The gratings were imprinted in the core of a single mode fiber using a phase mask technique. All Bragg gratings had equal characteristics, e.g. length, reflectivity, and their Bragg wavelength was about 1535.7 nm. The printed gratings were apodized, and therefore, their reflection spectra had a low level of side lobes. All Bragg gratings were about 2 mm long and had a reflection bandwidth of 0.4 nm. Each of 17 gratings had about 5% of reflectivity. A typical reflection spectrum of the fiber containing these gratings in normal undisturbed conditions is shown in FIG. 3b.

The fiber was attached mechanically, in multiple points, to a long elastic rod, one segment of which had to be strained. Fixing points were located between adjacent Bragg gratings. As light source 31, we used a diode laser. Its operation wavelength was of 1536.77 nm, and, correspondingly the difference between Bragg wavelength of undisturbed gratings and the operation wavelength of the laser was about 1 nm. In normal undisturbed conditions, the laser wavelength was out of the main reflection band of the Bragg gratings. Therefore, in normal conditions, the fiber reflectivity was low.

When an excess strain of the monitored structure appears somewhere along the fiber, it produces elongation of the fiber segment that contains one or several Bragg gratings. Because of the fiber elongation, a reflection spectrum of the affected grating shifts towards longer wavelength range. Beginning from some strain level, the main lobe of the grating reflection spectrum overlaps with the operation wavelength of the diode laser and the total reflectivity of the fiber at that wavelength increases. Correspondingly, the photodetector current changes from a low level in normal conditions to a higher level when an external influence exceeds some threshold level. FIG. 3c shows a measured reflected light power versus strain applied to the fiber section containing one Bragg grating. The fiber reflection increases almost 50 times in respect with normal unstrained conditions and reaches the maximum at strain level of 1050 µε when the grating's Bragg wavelength coincides with the fixed operation wavelength of the light source.

The difference between the operation wavelength of the interrogating diode laser and the nominal Bragg wavelength of gratings in normal conditions determines a threshold level for a specific application. For some applications it should be large enough in order to avoid false alarm signals due to possible temperature variations. For described above experiment, the threshold strain level was selected to be of 1000 µε. In this case, temperature variations in the range ±40° C. will not produce any false alarm signal.

To detect the monitored conditions reliably, the change of signal from the photodetector 32 must be well distinguishable from other signal variations due to noise. To evaluate the requirements for the light source, photodetector and properties of sensitive elements, the following analysis of the operation of the proposed embodiment of the inventions shown in FIG. 1a and FIG. 2a is presented.

The transparency of the fiber can be calculated as $$T(\lambda) = T_0 \prod_{k=1}^{K} [1 - d_k(\lambda)], \quad (1)$$

here $T_0$ is the transparency of the fiber itself, K is a total number of sensing elements, and $d_k(\lambda)$ is a loss coefficient or reflectivity of k-th sensing element at the operation wavelength of light source. If the losses or reflectivities of sensing elements in the second wavelength range in normal undisturbed state are small enough to satisfy the condition $$\sum_{k=1}^{K} d_k(\lambda) \ll 1 \quad (2)$$

in this case $$\sum_{k=1}^{K} d_k(\lambda) \approx K \overline{d(\lambda)},$$

where $\overline{d(\lambda)}$ is an average reflectivity or loss of undisturbed sensitive elements, and the fiber transparency under normal undisturbed conditions (1)

$$T_{norm}(\lambda) = T_0 \left[1 - \sum_{k=1}^{K} d_k(\lambda)\right] \approx T_0[1 - K\overline{d(\lambda)}]. \quad (3)$$

If, instead, the loss coefficient or reflectivity of any, say n-th, sensitive element increases due to the shift of its reflection or loss band into the second wavelength range, the transparency of the fiber, in this case, $$T(\lambda) = T_0[1 - D_n(\lambda)] \prod_{k=1}^{K} [1 - d_k(\lambda)],$$

or, $$T(\lambda) = T_0[1 - D_n(\lambda)] \left[1 - \sum_{k=1}^{K} d_k(\lambda)\right] \quad (4)$$

$$\approx T_0[1 - D_n(\lambda) - (K-1)\overline{d(\lambda)}].$$

here, in both equations, k≠n. Therefore, the absolute value of the change of transparency of entire fiber, when one of sensitive element is under the influence of the specified condition, is $$|T(\lambda) - T_{norm}(\lambda)| = T_0[D_n(\lambda) - \overline{d(\lambda)}]. \quad (5)$$

The change of signal, or photo-current, at the output of the photodetector 32 in this case $$\Delta J = \mathfrak{R} I T_0 [D_n(\lambda) - \overline{d(\lambda)}],$$

where $\mathfrak{R}$ is a responsivity of the photodetector, I is an optical power of the light source. To reliably detect this signal change, it has to be substantially greater than output current variations due to a noise. Typically it is accepted that that change must be greater than triple standard deviation of the noise $\sigma_{ph}$. Therefore the relation $$\mathfrak{R} I T_0 [D_n(\lambda) - \overline{d(\lambda)}] > 3\sigma_{ph} \quad (6)$$

can be used to estimate required optical power of the light source I, responsivity of the photodetector $\mathfrak{R}$, and to design the sensitive elements, Bragg gratings, for example, which would provide necessary reflectivity or losses $d(\lambda)$ and $D_n(\lambda)$ in undisturbed state and under effective conditions being monitored, accordingly.

Similarly, for the embodiment of the invention, utilizing sensitive elements with characteristic reflection bands, the change of signal from the photodetector 32 must be well distinguishable from other signal variations due to photodetector noise. To evaluate the requirements for the light source 31, photodetector 32 and properties of sensitive elements in this case, the analysis of the operation of the embodiment shown in FIG. 2a is also presented below.

If, in the second wavelength range, the reflectivities rk of sensing elements in normal undisturbed state are small enough to satisfy the condition $$\sum_{k=1}^{K} r_k(\lambda) \ll 1, \quad (7)$$

in this case $$\sum_{k=1}^{K} r_k(\lambda) \approx K\overline{r(\lambda)},$$

where $\overline{r(\lambda)}$ is an average reflectivity of undisturbed sensitive elements, the reflectivity of the fiber under normal undisturbed conditions $$R_{norm}(\lambda) = R_0 + \sum_{k=1}^{K} r_k(\lambda) \approx R_0 + K\overline{r(\lambda)}. \quad (8)$$

Here, K is a total number of sensitive elements, $R_0$ is a reflection of the fiber itself, we assume that $R_0 \ll 1$. If the reflectivity of any, say n-th, sensitive element increases due to the shift of its reflection band into the second wavelength range, the reflectivity of the fiber, in this case, $$R(\lambda) \approx R_0 + R_n(\lambda) + (K-1)\overline{r(\lambda)}, \quad (9)$$

here, k≠n. In (9) it is supposed that the reflectivity of the sensitive element under the influence of monitored condition is still small: $R_n(\lambda) \ll 1$. Therefore, the absolute value of the change of reflectivity of entire fiber, when one of sensitive element is under the influence of the specified condition, is $$|R(\lambda) - R_{norm}(\lambda)| = R_n(\lambda) - \overline{r(\lambda)} \quad (10)$$

in comparison with the reflectivity under normal conditions (8). The change of signal, or photo-current, at the output of the photodetector 32 in this case $$\Delta J = \frac{\Re I}{4}[R_n(\lambda) - \overline{r(\lambda)}],$$

where $\Re$ is a responsivity of the photodetector, I is an optical power of the light source. The denominator 4 appears in the last equation due to light losses in the coupler 40 in the embodiment shown in FIG. 2a. Applying similar approach as was used to obtain the inequality (6), the following relation, $$\frac{\Re I}{4}[R_n(\lambda) - \overline{r(\lambda)}] > 3\sigma_{ph} \quad (11)$$

can be utilized to estimate required optical power of the light source I, sensitivity of the photodetector $\Re$, and to design the sensitive elements, Bragg gratings, for example, which would provide necessary reflectivities $r(\lambda)$ and $R_n(\lambda)$ in undisturbed state and under conditions being effective, accordingly. It is necessary to note, however, that in this analysis, the light losses on the propagation through the fiber have not been taken into account. In such a configuration, the losses will have different value depending on the location of the reflective element along the fiber. Worst scenario includes the case when this reflective element is located near far end of the fiber. In latter case, the final inequality (11) can be rewritten as $$\frac{\Re I T_0^2}{4}[R_n(\lambda) - \overline{r(\lambda)}] > 3\sigma_{ph}. \quad (12)$$

Here, $T_0$ is a transparency of the entire fiber.

FIG. 4 presents one more embodiment of the invention comprising light source 31, bidirectional coupler 40, the fiber 10 with sensitive elements 20, reflective member 50 and photodetector 32. In this embodiment, the characteristic band of sensitive elements, which can be long period gratings, is a loss band, and light from the light source 31 operating within second wavelength range passes twice through the fiber 10 to improve the difference between signal values before and after the monitored condition becomes effective. For this purpose, a reflective member 50 has been included. The reflective member can be a reflective thin film on the end of the filter.

FIG. 5 shows embodiment comprising of the fiber 10 with sensitive elements 20 and means 30 for probing fiber reflection. Means 30 also provide a localization of the sensitive element whose characteristic band has been shifted due to the influence of the specified condition when it becomes effective. In embodiment shown in FIG. 5, it is provided by whether time domain or frequency domain reflectometer. Such an embodiment allows the detection of the condition being monitored and also the localization of the position of specific sensitive element where this condition becomes effective. The reflectometer used in this embodiment operates in the second wavelength range to detect and localize only the sensitive elements whose characteristic band has been shifted into that range.

It is well known however that the reflectometer are typically expensive devices and usage of these devices on permanent basis is discouraged if the alarming conditions a rare. In this situation, embodiments shown in FIG. 6 and FIG. 7 can be used, both include all subsystems required to detect monitored conditions and provide means for connection of external reflectometers when it becomes necessary.

FIG. 6 shows embodiment similar to the shown in FIG. 2a with an additional bidirectional coupler 41 for optical connection of external time domain or frequency domain reflectometer.

FIG. 7 shows embodiment also similar to the shown in FIG. 2a but with an additional means for external modulation 33 of light source 31 and an amplifier 34 for output of the signal from the photodetector. Using this embodiment, time domain or frequency domain reflectometry can be implemented utilizing external electronic and/or digital control of the light source 31 and processing the signals from the photodetector 32.

Figure 8:
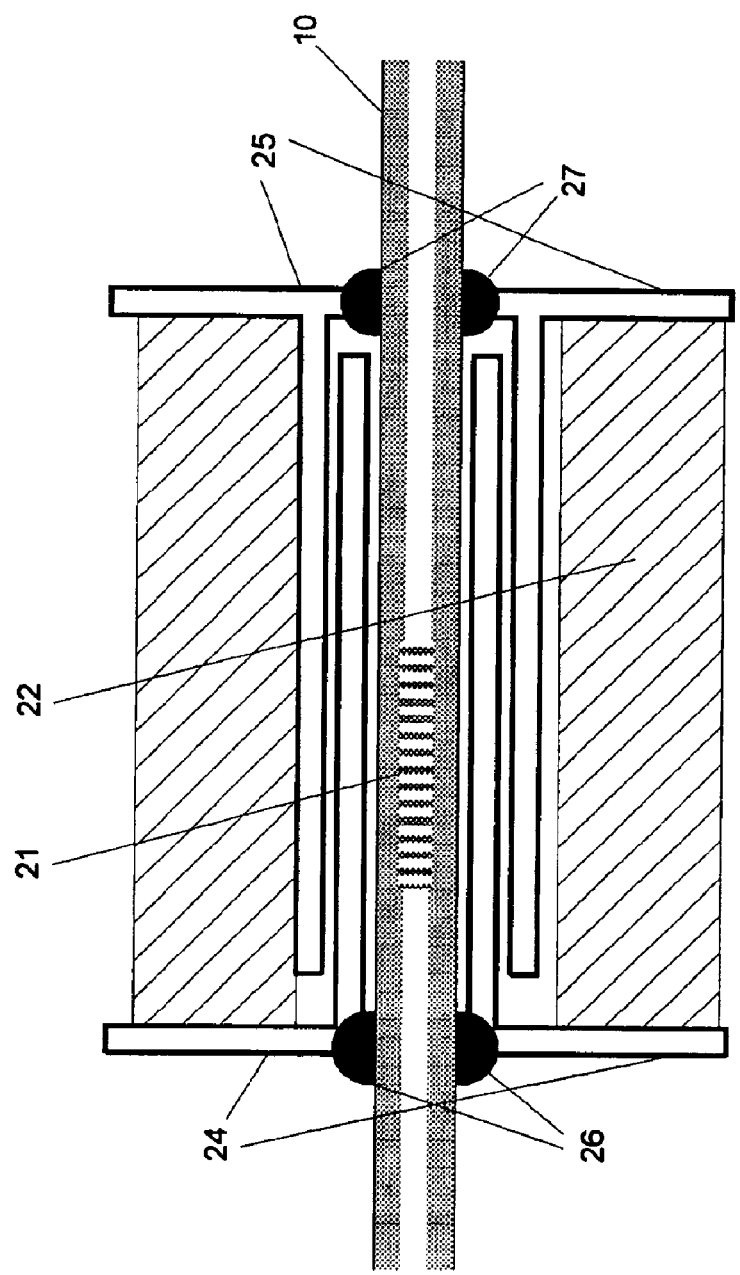
FIG. 8 is a diagram of a eighth embodiment of the invention.

FIG. 8 shows the embodiment of sensitive element for locating fluid presence. Sensitive element comprising of optical fiber 10 with imprinted Bragg grating 21 mechanically connected with members 24 and 25 by epoxy compound 26 and 27. Space between members 24 and 25 filled with polymer 22 swelling under the presence of the fluid. As a swelling material butyl rubber, silicone rubber or other polymer with appropriate response on the specific fluid can be used. Swelling polymer 22, in presence of the hydrocarbons, produces an axial strain on the fiber 10 and imprinted in fiber core Bragg grating 21, leading to the shift of its reflection spectrum. Using a series of such sensitive elements in any embodiment shown in FIGS. 1–6 or alike, the fluid presence detection system can be designed.

Figure 9:
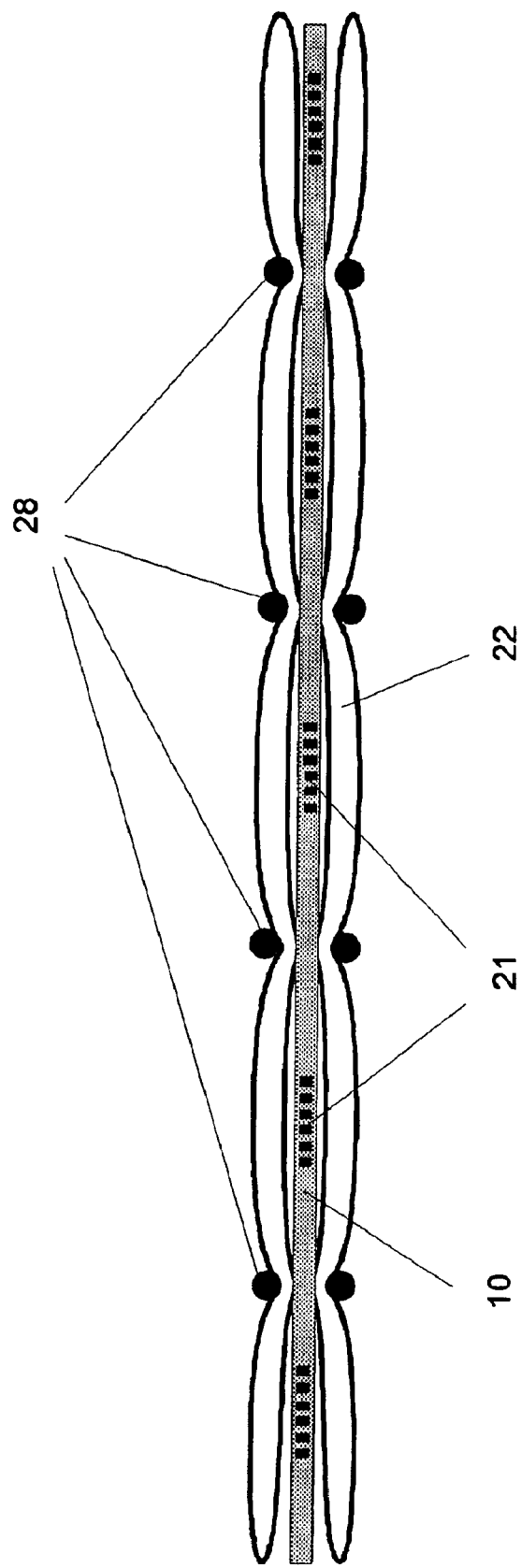
FIG. 9 is a diagram of a ninth embodiment of the invention.
Figure 10:
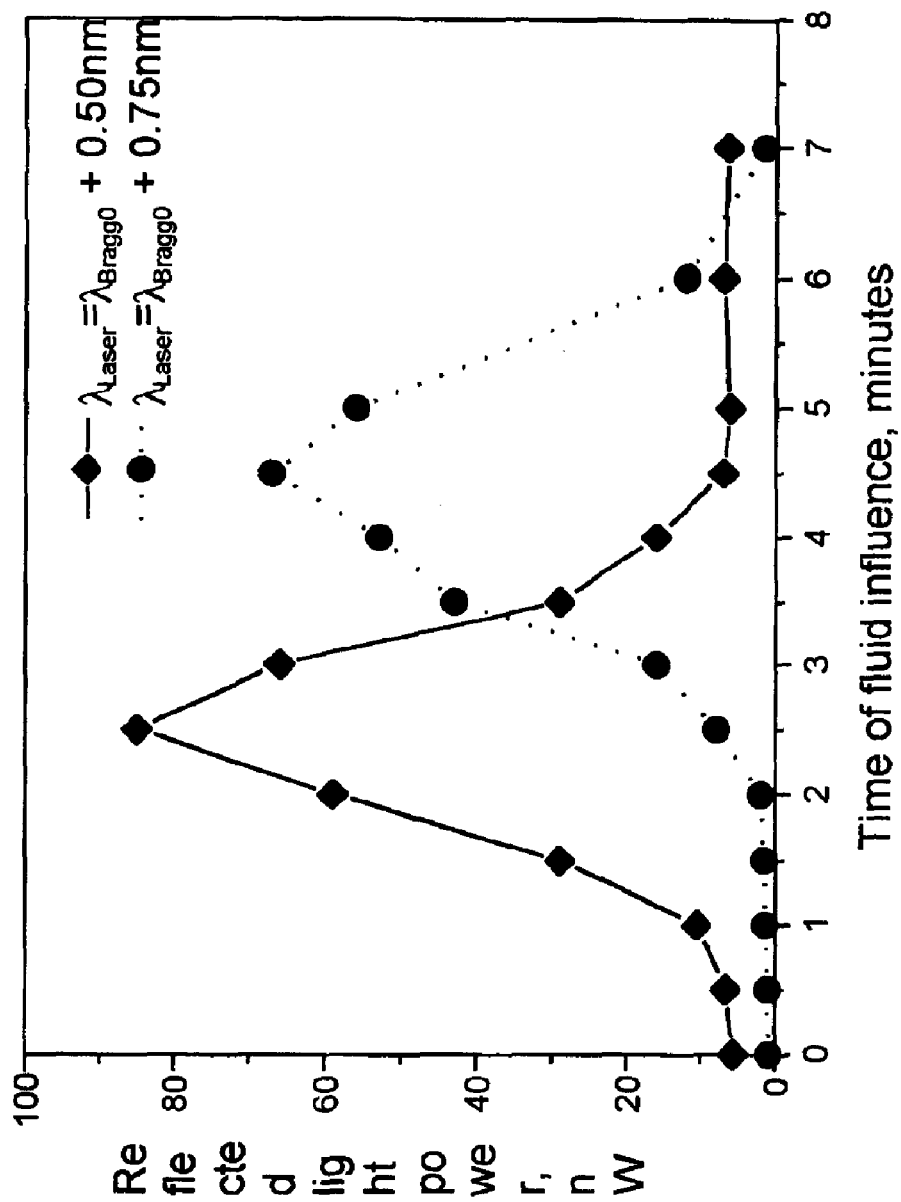
FIG. 10 shows experimental data for distributed detector of fluid leak using embodiment shown in FIG. 9.

FIG. 9 shows the embodiment of the invention suitable for distributed detection and location of fluid presence. FIG. 9 shows schematically cross section of a sensitive fiber-optic cable. An optical fiber 10 with imprinted Bragg gratings 21 is placed freely inside a tubing made of polymer 22 swelling under the contact with the fluid. The tubing may be made from butyl rubber, silicone rubber or other polymer able to swell in presence of the specific fluid. In a plurality of positions along the fiber length, special squeezing members 28 squeeze the polymer tubing together with the fiber in order to produce a good mechanical contact and increase friction between the polymer tubing and the fiber. By these means, the fiber is mechanically fixed to the polymer tubing at positions where squeezing members 28 are placed. One squeezing member is placed in between each two adjacent Bragg gratings. Instead of squeezing members, any other means suitable to attach the fiber to the polymer tubing can be used. Such means may be, for example, a jointing adhesive. Elongation of the tubing due to swelling of the polymer 22 on the length interval between any pair of adjacent squeezing members 28 strains the fiber and results in a shift of the reflection spectrum of the Bragg grating located at the said interval. Then, a distributed system for detection and location of fluid presence can be designed using any embodiment shown in FIGS. 1–6. We tested experimentally the embodiment shown in FIG. 9. The optical fiber with imprinted Bragg gratings was placed loosely inside tubing made of silicone rubber. Internal diameter of the tubing was of 1 mm, an external diameter of tubing was of 3 mm. Distances between adjacent Bragg gratings were approximately 30 centimeters. One squeezing member was placed between adjacent Bragg gratings. We tested reflection of the fiber using an arrangement similar to that shown in FIG. 3a. A short 10 cm long segment of polymer tubing with the fiber inside was submerged into the fluid. The test was repeated at two different diode laser wavelengths separated from the nominal Bragg wavelength of gratings by 0.5 and 0.75 nm correspondingly. Results of this experiment are shown in FIG. 10. Response time of the sensor depends on how close the laser wavelength can be set to the reflection band of the fiber in undisturbed conditions. Since an ambient temperature variation can also shift the reflection band of Bragg gratings with a typical rate of 0.01 nm/° C., some wavelength gap may be required in order to avoid false alarms. Wavelength separation of 0.75 nm allows ambient temperature variations within 50 C temperature range without false alarm signals.

The foregoing description of the preferred embodiments of the invention has been presented to demonstrate, the principles of the invention and does not limit the invention to the particular embodiment illustrated.

What is claimed is:

1. An optical fiber sensor system comprising:
    a) an optical fiber having the capability transmitting light signals within a first wavelength range and within a second wavelength range, wherein said second wavelength range does not overlap with said first wavelength range,
    b) a first plurality of sensitive elements said first plurality of sensitive elements being optically and mechanically coupled to said optical fiber, said sensitive elements having a characteristic spectral band occupying said first wavelength range under normal conditions, said characteristic spectral band of at least one sensitive element having the capability of at least partially shifting from said first wavelength range into said second wavelength range, said shifting into said second wavelength range being triggered by a predefined event;
    c) means for probing integral optical attenuation or integral optical reflection within said second wavelength range of said optical fiber, said means for probing said integral optical attenuation or said integral optical reflection within said second wavelength range of said optical fiber being a light source and a photosensitive apparatus, such that when said integral optical attenuation or said integral optical reflection of said optical fiber in said second wavelength range exceeds a predetermined threshold value, an alarm condition is indicated.

2. The optical fiber sensor system according to claim 1, wherein said sensitive elements are bent segments of said fiber and said characteristic band is a loss band.

3. The optical fiber sensor system according to claim 1, wherein said sensitive elements are long period gratings imprinted in said fiber and said characteristic band is a loss band.

4. The optical fiber sensor system according to claim 1, wherein said sensitive elements are Bragg gratings imprinted in said fiber and said characteristic band is a reflection band.

5. The optical fiber sensor system according to claim 4, further comprising an elastic member capable of transforming an external influence into a strain of said optical fiber, wherein said optical fiber is placed with a predetermined tension in close vicinity of said elastic member wherein said fiber is fixed to said elastic member in a second plurality of points of fixing, such that at least one point of fixing is located between each two Bragg gratings.

6. The optical fiber sensor system according to claim 5, further comprising clamps wherein said optical fiber is fixed to said elastic member by means of said clamps.

7. The optical fiber sensor system according to claim 5, further comprising an adhesive, wherein said optical fiber is fixed to said elastic member by means of said adhesive.

8. The optical fiber sensor system according to claim 5, wherein said elastic member is hollow and said optical fiber is placed inside said hollow.

9. The optical fiber sensor system according to claim 8, wherein said elastic member comprises tubing.

10. The optical fiber sensor system according to claim 1, wherein said photosensitive apparatus is a photodetector.

11. The optical fiber sensor system according to claim 1, wherein said characteristic spectral band is a loss band and said light source is coupled at a first end of said optical fiber and said photosensitive apparatus is coupled at a second end of said optical fiber.

12. The optical fiber sensor system according to claim 1, wherein said characteristic band is a reflection band and said light source is coupled at said first end of said fiber and said photosensitive apparatus is coupled at said second end of said fiber.

13. The optical fiber sensor system according to claim 1, comprising a first bi-directional coupler, said first bi-directional coupler transmitting light in a forward direction from said light source to said optical fiber and from said optical fiber to said photodetector.

14. The optical fiber sensor system according to claim 13, further comprising a reflective member at said second end of said fiber.

15. The optical fiber sensor system according to claim 14, wherein said reflective member is a mirror.

16. The optical fiber sensor system according to claim 14, wherein said reflective member is provided by reflective coating at said second end of said fiber.

17. The optical fiber sensor system according to claim 1, wherein said light source is a broadband source.

18. The optical fiber sensor system according to claim 17, wherein said light source is a light emitting diode.

19. The optical fiber sensor system according to claim 1, wherein said light source is a narrow band source.

20. The optical fiber sensor system according to claim 19, wherein said light source is a laser.

21. The optical fiber sensor system according to claim 1, wherein said means for probing said integral optical attenuation or said integral optical reflection of said optical fiber further comprises means for localization of a specific sensitive element, wherein said specific sensitive element has said characteristic spectral band shifted at least partially into said second wavelength range.

22. The optical fiber sensor system according to claim 21, wherein said means for localization of said specific sensitive element is an optical time domain reflectometer operating in said second wavelength ranges.

23. The optical fiber sensor system according to claim 13, further comprising a second bi-directional coupler for connection of an optional external means for localization of said specific sensitive elements, and wherein second bi-directional coupler is connected between said optical fiber and said first bi-directional coupler.

24. The optical fiber sensor system according to claim 13, further comprising means for modulation of radiation of said light source by an external electrical signal.

25. The optical fiber sensor system according to claim 21, wherein said means for localization of said specific sensitive element is an optical frequency domain reflectometer operating in said second wavelength range.

26. The optical fiber sensor system according to claim 5, wherein said elastic member is made of material with a high thermal expansion coefficient and said predefined event is an overheat.

27. The optical fiber sensor system according to claim 26, wherein said elastic member is made of stainless steel.

28. The optical fiber sensor system according to claim 4, further comprising fixing said optical fiber with a predetermined tension to a structure to be monitored in points located between each of two adjacent said elements of said plurality of sensitive elements, wherein said optical fiber sensor system is used to detect excess strain.

29. The optical fiber sensor system according to claim 5, further comprising said elastic member being made of a material having a low thermal expansion coefficient, and said elastic member being fixed to a structure to be monitored at more then one point, wherein said optical fiber sensor system is used as an excess strain detection system.

30. The optical fiber sensor system according to claim 5, wherein said elastic member is comprised of material capable of swelling when in contact with a fluid.

31. The optical fiber sensor system according to claim 30, wherein said fluid is being monitored for leakage.

32. The optical fiber sensor system according to claim 30, wherein said elastic member is comprised of butyl rubber.

33. The optical fiber sensor system according to claim 30, wherein said elastic member is comprised of silicone rubber.

* * * * *